(12) United States Patent
Yanagisawa et al.

(10) Patent No.: US 11,317,571 B2
(45) Date of Patent: May 3, 2022

(54) EMITTER AND DRIP IRRIGATION TUBE

(71) Applicant: Enplas Corporation, Saitama (JP)

(72) Inventors: Kazuma Yanagisawa, Saitama (JP); Koki Ono, Saitama (JP)

(73) Assignee: Emplas Corporation, Saitama (JP)

( * ) Notice: Subject to any disclaimer, the term of this patent is extended or adjusted under 35 U.S.C. 154(b) by 20 days.

(21) Appl. No.: 16/963,867

(22) PCT Filed: Jan. 18, 2019

(86) PCT No.: PCT/JP2019/001521
§ 371 (c)(1),
(2) Date: Jul. 22, 2020

(87) PCT Pub. No.: WO2019/146528
PCT Pub. Date: Aug. 1, 2019

(65) Prior Publication Data
US 2021/0037726 A1 Feb. 11, 2021

(30) Foreign Application Priority Data

Jan. 23, 2018 (JP) .............................. JP2018-008748
May 28, 2018 (JP) .............................. JP2018-101334

(51) Int. Cl.
*A01G 25/02* (2006.01)
*A01G 25/06* (2006.01)
(Continued)

(52) U.S. Cl.
CPC ........... *A01G 25/023* (2013.01); *A01G 25/06* (2013.01); *A01G 13/0275* (2013.01); *A01G 2025/006* (2013.01)

(58) Field of Classification Search
CPC ..................... A01G 25/023; A01G 2025/006
See application file for complete search history.

(56) References Cited

U.S. PATENT DOCUMENTS 3,998,427 A * 12/1976 Bentley ................ A01G 25/023
251/208
5,183,208 A * 2/1993 Cohen .................. A01G 25/023
239/542
(Continued)

FOREIGN PATENT DOCUMENTS

EP 3075236 10/2016
JP 2017-042106 3/2017
(Continued)

OTHER PUBLICATIONS

International Search Report and the Written Opinion dated Apr. 9, 2019 From the International Searching Authority Re. Application No. PCT/JP2019/001521 and Its Translation of Search Report Into English. (10 Pages).

(Continued)

*Primary Examiner* — Joseph A Greenlund

(57) ABSTRACT

An emitter provided with: a water intake part that communicates with the interior of a tube when the emitter is joined to the tube; a pressure-reducing flow channel part for forming a pressure-reducing flow channel; a flow rate adjustment part for adjusting the flow rate of the irrigation liquid in accordance with the pressure of the irrigation liquid inside the tube; and a discharge part that faces a discharge opening. The flow rate adjustment part has: a base; an accommodation part that accommodates the base; a communication hole that opens to the base and communicates with the discharge part; and a diaphragm part that is flexible and is disposed so as to be separated from the base, the diaphragm part approaching the base when the pressure of the irrigation liquid inside the tube is received.

7 Claims, 7 Drawing Sheets

(51) Int. Cl.
*A01G 13/02* (2006.01)
*A01G 25/00* (2006.01)

(56) References Cited

U.S. PATENT DOCUMENTS

| | | | | |
|---|---|---|---|---|
| 6,027,048 | A * | 2/2000 | Mehoudar | A01G 25/023 |
| | | | | 239/542 |
| 8,096,491 | B2 * | 1/2012 | Lutzki | A01G 25/023 |
| | | | | 239/542 |
| 10,327,396 | B2 * | 6/2019 | Kidachi | A01G 25/16 |
| 10,362,740 | B2 * | 7/2019 | Kidachi | A01G 25/023 |
| 10,383,290 | B2 * | 8/2019 | Kidachi | A01G 25/023 |
| 2002/0166907 | A1 * | 11/2002 | Boswell | A01G 25/023 |
| | | | | 239/542 |
| 2007/0194149 | A1 * | 8/2007 | Mavrakis | A01G 25/06 |
| | | | | 239/542 |
| 2010/0282873 | A1 * | 11/2010 | Mattlin | A01G 25/023 |
| | | | | 239/542 |
| 2011/0192916 | A1 * | 8/2011 | Causby | G05D 7/0113 |
| | | | | 239/542 |
| 2016/0286740 | A1 * | 10/2016 | Kidachi | B05B 1/202 |
| 2018/0098514 | A1 * | 4/2018 | Socolsky | A01G 25/023 |
| 2018/0192598 | A1 * | 7/2018 | Kidachi | A01G 25/02 |
| 2020/0288653 | A1 * | 9/2020 | Socolsky | A01G 25/023 |
| 2021/0037726 | A1 * | 2/2021 | Yanagisawa | A01G 25/06 |
| 2021/0204494 | A1 * | 7/2021 | Yanagisawa | A01G 25/023 |

FOREIGN PATENT DOCUMENTS

| | | |
|---|---|---|
| WO | WO 2017/093882 | 6/2017 |
| WO | WO 2019/146528 | 8/2019 |

OTHER PUBLICATIONS

Supplementary European Search Report and the European Search Opinion dated Sep. 15, 2021 From the European Patent Office Re. Application No. 19744424.3. (7 Pages).

* cited by examiner

EMITTER AND DRIP IRRIGATION TUBE

TECHNICAL FIELD

The present invention relates to an emitter and a drip irrigation tube including the emitter.

BACKGROUND ART

In the related art, drip irrigation is known as a method of growing plants. The drip irrigation method is a method in which drip irrigation tubes are placed in the soil where plants are planted and irrigation liquid such as water or liquid fertilizer is dripped from the drip irrigation tubes into the soil. In recent years, drip irrigation methods have received particular attention because of their ability to minimize the consumption of liquid for irrigation.

A drip irrigation tube has a tube with a plurality of through holes through which the irrigation liquid is discharged, and a plurality of emitters (also referred to as "drippers") joined to the inner surface of said tube to discharge the irrigation liquid from each through hole (see, for example, PTL 1).

PTL 1 discloses an emitter including a body and a flap that is movable about a hinge with respect to the body. This flap is formed of a material that is similar to or preferably the same as the material of the body. In addition, this flap includes a film (diaphragm) disposed in a frame. In an operational state with the emitter that has been assembled, a recess of the body is covered with the film of the flap turned about the hinge. The recess is formed in the body with a rim provided in a frame housing as a peripheral portion. When the film of the flap is pressed against the rim, a pressure adjustment chamber is formed. The flow rate of liquid that flows out of the pressure adjustment chamber is adjusted by elastic deflection of the film in accordance with pressure variation.

CITATION LIST

Patent Literature

PTL 1
WO2017/093882

SUMMARY OF INVENTION

Technical Problem

In the emitter disclosed in PTL 1, the flap and the body are integrally molded as one part in the state where the flap is open. Then, when the recess formed in the body is covered with the film of the flap, the pressure adjustment chamber that adjusts the flow rate of the liquid discharged from the emitter is formed. As such, to set the emitter to the operative state, it is necessary to perform multiple processes such as a process of turning the flap about the hinge, and a process of coupling the turned flap to the body by chemical bonding and/or heat welding. Since such multiple processes increase the production cost of the emitter, the production cost is desirably reduced. In particular, since the process of coupling the flap to the body by bonding, welding and/or the like largely increases the production cost, an emitter that does not require bonding, welding or the like in the production process is desired.

An object of the present invention is to provide an emitter and a drip irrigation tube that can reduce the production cost.

Solution to Problem

An emitter according to an embodiment of the present invention is configured to be joined on an inner wall surface of a tube configured to carry irrigation liquid at a position corresponding to a discharging port configured to communicate between inside and outside of the tube, the emitter being configured to quantitatively discharge the irrigation liquid in the tube to the outside of the tube from the discharging port, the emitter comprising: an intake part configured to communicate with the inside of the tube when the emitter is joined to the tube; a pressure reducing channel part communicated with the intake part and configured to form a pressure reducing channel, the pressure reducing channel being configured to carry the irrigation liquid while reducing a pressure of the irrigation liquid; a flow rate adjusting part communicated with the pressure reducing channel part and configured to adjust a flow rate of the irrigation liquid in accordance with a pressure of the irrigation liquid in the tube; and a discharging part communicated with the flow rate adjusting part and configured to face the discharging port when the emitter is joined to the tube. The flow rate adjusting part includes: a base, a housing part configured to house the base, a communication hole that opens at the base and communicates with the discharging part, and a diaphragm part having flexibility and disposed away from the base, the diaphragm part being configured to approach the base when the pressure of the irrigation liquid in the tube is exerted on the diaphragm part. The diaphragm part is provided as one part integrated with the intake part and the pressure reducing channel part. The base is a member provided separately from the diaphragm part, the intake part and the pressure reducing channel part.

A drip irrigation tube according to an embodiment of the present invention includes a tube including a discharging port configured to discharge irrigation liquid; and the emitter that is joined at a position corresponding to the discharging port of an inner wall surface of the tube.

Advantageous Effects of Invention

According to the present invention, it is possible to provide an emitter and a drip irrigation tube that can reduce the production cost.

DESCRIPTION OF EMBODIMENTS

Embodiments of the present invention will be elaborated below with reference to the accompanying drawings.

Embodiment 1

Configurations of Drip Irrigation Tube and Emitter

Figure 1:
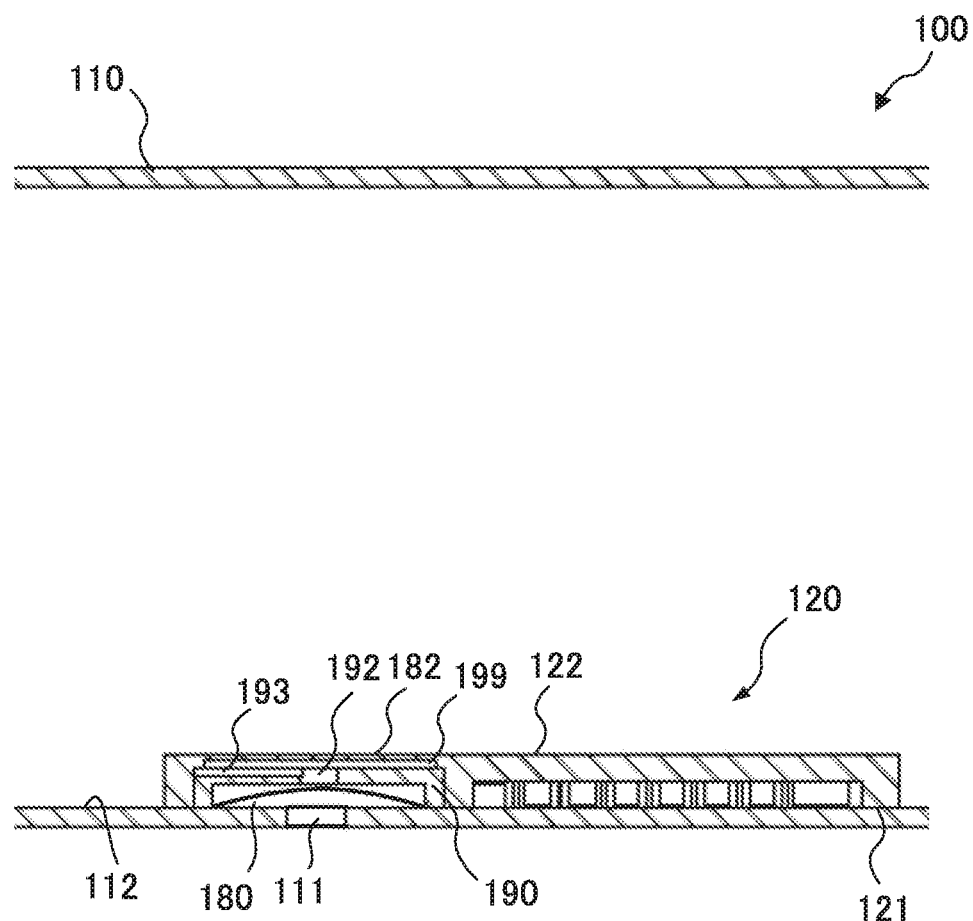
FIG. 1 is a sectional view of a drip irrigation tube according to Embodiment 1 of the present invention (including a sectional view of the emitter taken along line A-A of FIG. 2A)

FIG. 1 is a sectional view of drip irrigation tube 100 according to Embodiment 1 in the direction along the axis. As illustrated in FIG. 1, drip irrigation tube 100 includes tube 110 and emitter 120.

Tube 110 is a tube for carrying irrigation liquid. Examples of the irrigation liquid include water, liquid fertilizer, agricultural chemicals and mixtures thereof. In tube 110, the flow direction of the irrigation liquid is not limited. In addition, the material of tube 110 is not limited. In the present embodiment, the material of tube 110 is polyethylene.

In the pipe wall of tube 110, a plurality of discharging ports 111 for discharging irrigation liquid are formed at a predetermined interval (e.g., from 200 mm to 500 mm) in the axis direction of tube 110. The diameter of the opening of discharging port 111 is not limited as long as the irrigation liquid can be discharged. In the present embodiment, the diameter of the opening of discharging port 111 is 1.5 mm. Each emitter 120 is joined at a position corresponding to discharging port 111 of inner wall surface 112. The shape and area of tube 110 in the cross-section perpendicular to the axis direction are not limited as long as emitter 120 can be disposed inside tube 110.

Drip irrigation tube 100 is produced by joining rear surface 121 of emitter 120 to inner wall surface 112. The method of joining tube 110 and emitter 120 is not limited. Examples of the method of joining tube 110 and emitter 120 include welding of the resin material constituting tube 110 or emitter 120 and bonding using an adhesive agent. Note that while discharging port 111 is formed after tube 110 and emitter 120 are joined in the present embodiment, discharging port 111 may be formed before they are joined.

Figure 2A:
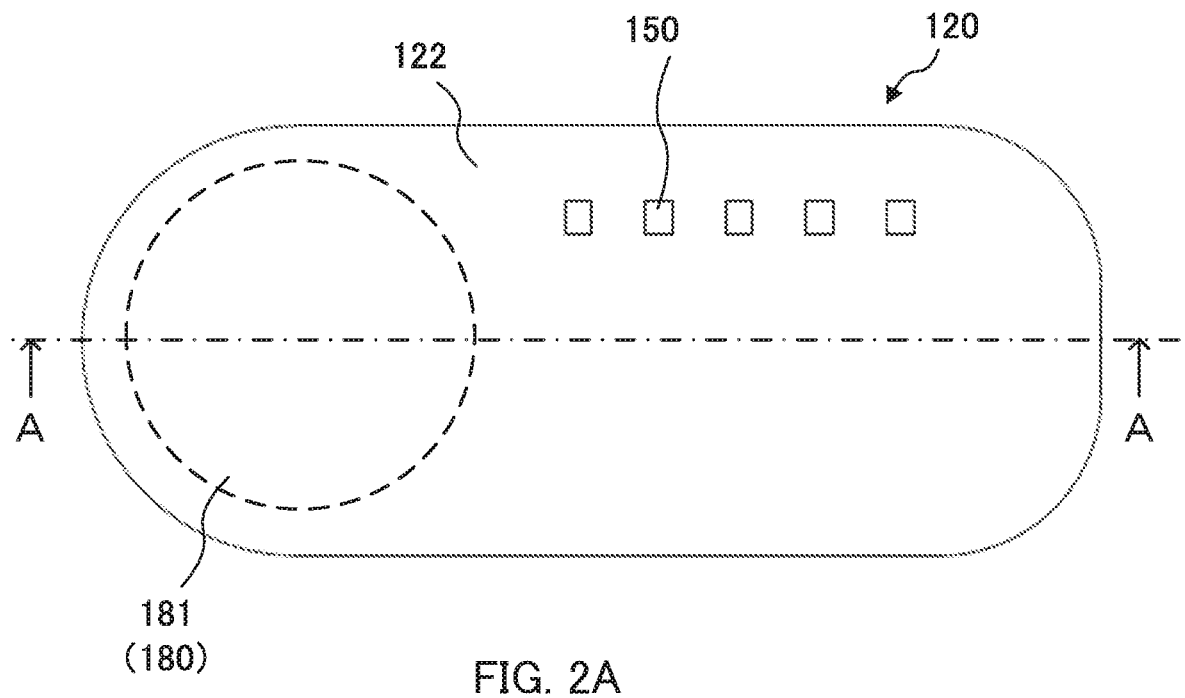
FIGS. 2A and 2B illustrate a configuration of an emitter according to Embodiment 1 of the present invention.
Figure 2B:
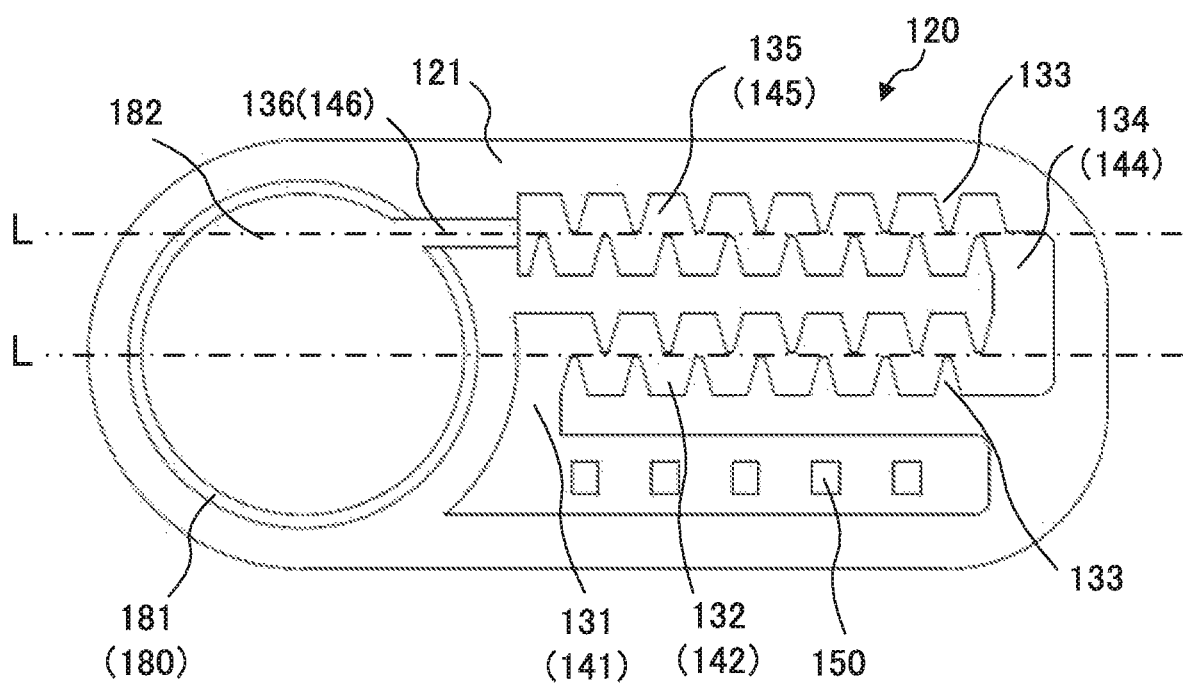

FIGS. 2A and 2B illustrate a configuration of emitter 120 according to Embodiment 1. FIG. 2A is a plan view of emitter 120, and FIG. 2B is a bottom view of emitter 120. FIG. 2B illustrates emitter 120 in the state where base 190 is removed (hereinafter referred to also as "emitter body").

As illustrated in FIG. 1, emitter 120 is joined to inner wall surface 112 of tube 110 so as to cover discharging port 111. The shape of emitter 120 is not limited as long as it can make intimate contact with inner wall surface 112 and cover discharging port 111. In the present embodiment, in the cross-section of emitter 120 perpendicular to the axis direction of tube 110, the shape of the rear surface that is joined to inner wall surface 112 is a substantially arc shape protruding toward inner wall surface 112 in a shape along inner wall surface 112. As illustrated in FIG. 2A, the shape in plan view of emitter 120 is a substantially rectangular shape with chamfered four corners. In the present embodiment, emitter 120 has a length of 19 mm in the long side direction, a length of 8 mm in the short side direction, and a height of 2.7 mm. The size of emitter 120 is not limited, and may be appropriately determined based on the desired discharge rate of irrigation liquid from discharging port 111.

In the present embodiment, emitter 120 is formed of a material having flexibility. It should be noted that, of the components of emitter 120, base 190 described later is a member separated from other components (emitter body). Examples of the material of emitter 120 include resin, elastomer and rubber. Examples of the resin include polyethylene and silicone. The flexibility of emitter 120 can be adjusted by use of an elastic resin material. Examples of the method of adjusting the flexibility of emitter 120 include selection of elastic resins, and adjustment of the mixing ratio of the elastic resin material to the hard resin material. Emitter body and base 190 may be formed of the same material, or different materials.

As illustrated in FIGS. 1, 2A and 2B, emitter 120 includes intake part 150, first connecting groove 131 serving as first connecting channel 141, first pressure reducing groove 132 serving as first pressure reducing channel 142, second connecting groove 134 serving as second connecting channel 144, second pressure reducing groove 135 serving as second pressure reducing channel 145, third connecting groove 136 serving as third connecting channel 146, discharging part 180, housing part 181 and base 190. Discharging part 180 is formed when base 190 is housed in housing part 181. In the following description, the surface of emitter 120 illustrated in FIG. 2A is front surface 122, and the surface illustrated in FIG. 2B is rear surface 121. First connecting groove 131, first pressure reducing groove 132, second connecting groove 134, second pressure reducing groove 135, third connecting groove 136 and housing part 181 are disposed on the rear surface 121 side of the emitter body.

When emitter 120 is joined to tube 110, first connecting groove 131, first pressure reducing groove 132, second connecting groove 134, second pressure reducing groove 135, third connecting groove 136 serve as first connecting channel 141, first pressure reducing channel 142, second connecting channel 144, second pressure reducing channel 145 and third connecting channel 146, respectively. With this configuration, a channel that is composed of intake part 150, first connecting channel 141, first pressure reducing channel 142, second connecting channel 144, second pressure reducing channel 145, third connecting channel 146 and housing part 181, and connects between intake part 150 and housing part 181 is formed. This channel carries irrigation liquid from intake part 150 to housing part 181.

A plurality of intake parts 150 are disposed along the longitudinal axial direction of emitter 120. In the present embodiment, five intake parts 150 are disposed at a distance from each other at the outer edge on one side in the minor axis direction of emitter 120 (see FIGS. 2A and 2B). As illustrated in FIGS. 2A and 2B, intake part 150 is an intake through hole extending from front surface 122 to rear surface 121 of emitter 120. When emitter 120 is joined to inner wall surface 112 of tube 110, the irrigation liquid in tube 110 is taken into emitter 120 from intake part 150.

Note that the positions of intake parts 150 are not limited to the above-described positions, and intake parts 150 may be provided at a distance from each other at outer edges on both sides in the minor axis direction of emitter 120. In addition, the number of intake parts 150 is not limited to five, and may be smaller or larger than five.

In addition, although not illustrated in the drawings, intake part 150 may include a screen member that prevents entry of floating matters in irrigation liquid into emitter 120, and the like, for example. The shape of the screen member is not limited as long as the above-described function can be ensured. For example, the screen member has a lattice structure or a wedge wire structure. Here the "lattice structure" refers to a structure including a pair of groups, each of which is composed of a plurality of linear members disposed parallel to each other, are disposed on top of another such that the extending directions of the linear members are different from each other between the groups. The positions of the groups in the height direction may be different from each other, or identical to each other. In addition, the "wedge wire structure" refers to a structure including a plurality of linear members disposed parallel to each other in which the distance between the linear members increases in the direction from the outer side to the inner side of emitter 120. In the case where the screen member has the wedge wire structure as described above, the pressure drop of the irrigation liquid flown into intake part 150 is suppressed while preventing entry of floating matters in irrigation liquid into emitter 120.

First connecting groove 131 connects between intake part 150 and first pressure reducing groove 132 (first pressure reducing channel 142). First connecting groove 131 is a groove linearly formed in the direction along the minor axis direction of emitter 120 in rear surface 121 of emitter 120. The upstream end of first connecting groove 131 is connected to intake part 150, and the downstream end of first connecting groove 131 is connected to first pressure reducing groove 132. When tube 110 and emitter 120 are joined to each other, first connecting groove 131 and inner wall surface 112 of tube 110 form first connecting channel 141. The irrigation liquid taken from intake part 150 flows to first pressure reducing channel 142 through first connecting channel 141.

First pressure reducing groove 132 connects between first connecting groove 131 (first connecting channel 141) and second connecting groove 134 (second connecting channel 144). First pressure reducing groove 132 reduces the pressure of the irrigation liquid taken from intake part 150, and guides it to second connecting groove 134. In the present embodiment, first pressure reducing groove 132 is a groove disposed along the longitudinal axial direction at a center portion of rear surface 121. The upstream end of first pressure reducing groove 132 is connected to first connecting groove 131, and the downstream end of first pressure reducing groove 132 is connected to second connecting groove 134. First pressure reducing groove 132 has a zigzag shape in plan view.

In first pressure reducing groove 132, a plurality of protrusions 133 protrude from the inner surfaces on both sides in an alternate form in the flow direction of the irrigation liquid in first pressure reducing channel 142 (see FIG. 2B). Preferably, in plan view of emitter 120, protrusions 133 protrude from the inner surface of first pressure reducing groove 132 such that the tips of protrusions 133 do not cross the center line L of first pressure reducing groove 132 (see FIG. 2B). When tube 110 and emitter 120 are joined to each other, first pressure reducing groove 132 and inner wall surface 112 of tube 110 form first pressure reducing channel 142. The pressure of the irrigation liquid taken from intake part 150 is reduced by first pressure reducing channel 142 and the irrigation liquid is guided to second connecting channel 144.

Second connecting groove 134 connects between first pressure reducing groove 132 (first pressure reducing channel 142) and second pressure reducing groove 135 (second pressure reducing channel 145). Second connecting groove 134 is a groove linearly formed in the direction along the minor axis direction of emitter 120 in rear surface 121. The upstream end of second connecting groove 134 is connected to first pressure reducing groove 132, and the downstream end of second connecting groove 134 is connected to second pressure reducing groove 135. When tube 110 and emitter 120 are joined to each other, second connecting groove 134 and inner wall surface 112 of tube 110 form second connecting channel 144. The irrigation liquid whose pressure has been reduced by first pressure reducing channel 142 flows to second pressure reducing channel 145 through second connecting channel 144.

Second pressure reducing groove 135 connects between second connecting groove 134 (second connecting channel 144) and third connecting groove 136 (third connecting channel 146). Second pressure reducing groove 135 reduces the pressure of the irrigation liquid flowing from second connecting channel 144, and guides the irrigation to third connecting groove 136. In the present embodiment, second pressure reducing groove 135 is a groove disposed along the longitudinal axial direction at the outer edge on one side in the minor axis direction of emitter 120 in rear surface 121. The upstream end of second pressure reducing groove 135 is connected to second connecting groove 134, and the downstream end of second pressure reducing groove 135 is connected to third connecting groove 136. Second pressure reducing groove 135 has a zigzag shape in plan view.

In second pressure reducing groove 135, a plurality of protrusions 133 protrude from the inner surfaces on both sides in an alternate form in the flow direction of the irrigation liquid second pressure reducing channel 145 (see FIG. 2B). Preferably, in plan view of emitter 120, protrusions 133 protrude from the inner surface of second pressure reducing groove 135 such that the tips of protrusions 133 do not cross the center line L of second pressure reducing groove 135 (see FIG. 2B). When tube 110 and emitter 120 are joined to each other, second pressure reducing groove 135 and inner wall surface 112 of tube 110 form second pressure reducing channel 145. The pressure of the irrigation liquid flowing from second connecting channel 144 is reduced by second pressure reducing channel 145 and the irrigation liquid is guided to third connecting channel 146.

Third connecting groove 136 connects between second pressure reducing groove 135 (second pressure reducing channel 145) and housing part 181. Third connecting groove 136 is a groove linearly formed along the longitudinal axial direction of emitter 120 in rear surface 121. The upstream end of third connecting groove 136 is connected to second pressure reducing groove 135, and the downstream end of third connecting groove 136 is connected to housing part 181. When tube 110 and emitter 120 are joined to each other, third connecting groove 136 and inner wall surface 112 of tube 110 form third connecting channel 146. The irrigation liquid whose pressure has been reduced by second pressure reducing channel 145 flows to housing part 181 through third connecting channel 146.

Housing part 181 is a recess having a substantially columnar shape. In housing part 181, base 190 is disposed for the purpose of adjusting the discharge rate, from discharging port 111 of tube 110, of the irrigation liquid from third connecting channel 146 (see FIG. 1). After base 190 is disposed in housing part 181, emitter 120 is joined to inner wall surface 112 of tube 110.

Figure 3A:
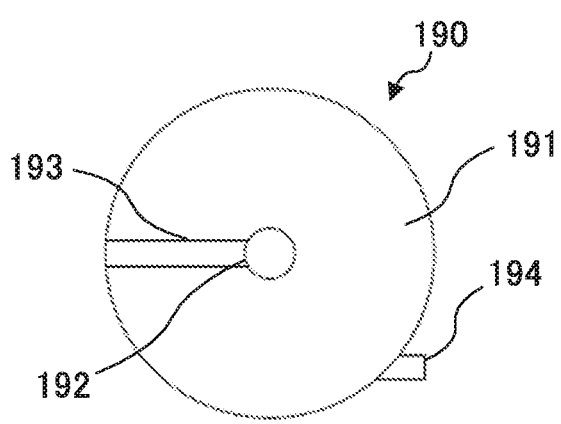
FIGS. 3A, 3B, 3C and 3D illustrate a configuration of a base according to Embodiment 1 of the present invention.
Figure 3E:
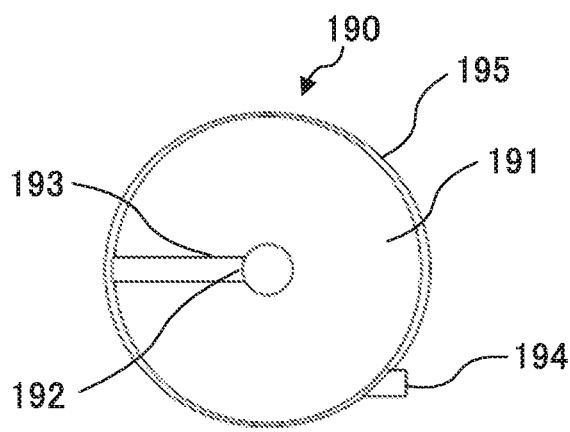
FIG. 3E illustrates a modification of a configuration of the base.
Figure 3B:
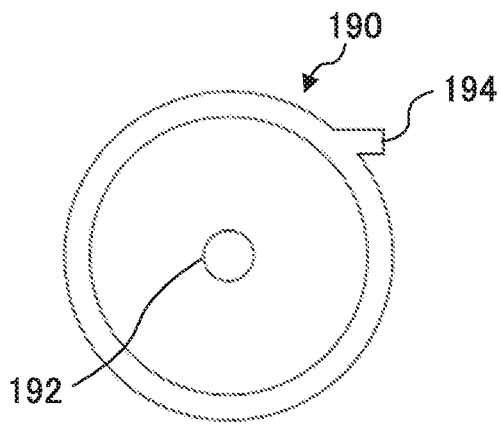
Figure 3C:
Figure 3D:
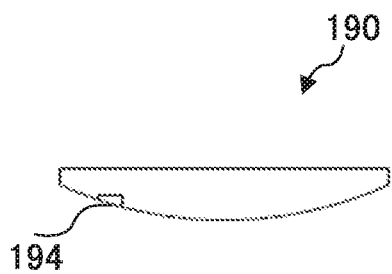

As illustrated in FIG. 1, base 190 is a substantially cylindrical member in which a large portion of the upper part is closed. FIG. 3A is a plan view of base 190, FIG. 3B is a bottom view of base 190, and FIG. 3C is a front view of base 190, and FIG. 3D is a right side view of base 190.

Base 190 includes communication hole 192, one linking groove 193, and protruding part 194. Communication hole 192 opens at a center portion of top surface 191 and communicates with discharging part 180 that faces discharging port 111 of tube 110 when emitter 120 is joined to tube 110 (see FIG. 1). Linking groove 193 links the outer edge of top surface 191 and communication hole 192 in top surface 191. Protruding part 194 has a substantially square columnar shape and protrudes from the side surface of base 190 (which corresponds to "second locking part" of the embodiment of the present invention). Protruding part 194 of base 190 can be locked with a part of third connecting groove 136 of the emitter body on the housing part 181 side (which corresponds to "first locking part formed in the housing part" of the embodiment of the present invention). Base 190 is disposed in housing part 181 such that protruding part 194 and a part of third connecting groove 136 on the housing part 181 side are locked together.

Base 190 is molded separately from other configurations of emitter 120 (the emitter body including intake part 150, first and second pressure reducing channels 142 and 145, and diaphragm part 182 described later). Base 190 is produced by injection molding, for example.

As illustrated in FIG. 1, when emitter 120 is joined to inner wall surface 112 of tube 110, a flow rate adjusting part for adjusting the flow rate of the irrigation liquid discharged from communication hole 192 of emitter 120 (base 190) in accordance with the pressure of the irrigation liquid in tube 110 is formed by base 190 disposed in housing part 181 and diaphragm part 182 provided opposite to top surface 191 of base 190. While diaphragm part 182 has a circular shape in plan view as illustrated in FIGS. 2A and 2B in the present embodiment, the shape of diaphragm part 182 of the embodiment of the present invention is not limited. In the present embodiment, diaphragm part 182 is molded as one part integrated with the components of emitter 120 (the emitter body including intake part 150, first and second pressure reducing channels 142 and 145) except for base 190. The emitter body including diaphragm part 182 is produced by injection molding, for example.

Diaphragm part 182 is molded as one part integrated with the emitter body and therefore has flexibility. In the state where emitter 120 is joined to inner wall surface 112 of tube 110, diaphragm part 182 is deformed toward the top surface 191 side of base 190 under the pressure of the irrigation liquid in tube 110.

An operation of diaphragm part 182 in accordance with the pressure of the irrigation liquid in tube 110 is described below.

Before irrigation liquid is fed into tube 110, the pressure of the irrigation liquid is not exerted on diaphragm part 182 and therefore diaphragm part 182 is not deformed (see FIG. 1).

When feeding of irrigation liquid into tube 110 is started, the pressure of the irrigation liquid in tube 110 begins to increase, and diaphragm part 182 begins to deform. When the pressure of the irrigation liquid is relatively low, the deformation of diaphragm part 182 is relatively small, and diaphragm part 182 does not make contact with top surface 191 of base 190. In this state, communication hole 192 of base 190 is not closed, and therefore the irrigation liquid flowing from third connecting channel 146 into space 199 between diaphragm part 182 and top surface 191 of base 190 (see FIG. 1) is discharged from communication hole 192 to discharging part 180. The higher the pressure of the irrigation liquid, the narrower the distance between diaphragm part 182 and top surface 191 of base 190, and therefore the flow rate of the irrigation liquid discharged from communication hole 192 to discharging part 180 is maintained within a given range even when the pressure of the irrigation liquid becomes high.

When the pressure of the irrigation liquid exceeds a set value, the deformation amount of diaphragm part 182 is further increased, and diaphragm part 182 makes intimate contact with top surface 191 of base 190. It should be noted that, even when diaphragm part 182 is in intimate contact with top surface 191 of base 190, linking groove 193 of base 190 is not closed. Therefore, the irrigation liquid flowing from third connecting channel 146 into space 199 flows through linking groove 193 so as to be discharged from communication hole 192 to discharging part 180. Thus, even when diaphragm part 182 is in intimate contact with top surface 191 of base 190, a given amount of irrigation liquid is discharged to discharging part 180.

With this configuration, regardless of the pressure of the irrigation liquid in tube 110, the flow rate of the irrigation liquid discharged from communication hole 192 can be maintained within a given range. That is, drip irrigation tube 100 according to the present embodiment can discharge the irrigation liquid at a predetermined flow rate to the outside of tube 110 regardless of whether the pressure of the irrigation liquid is low or high.

Note that the width of linking groove 193 is not limited. It suffices that the width of linking groove 193 is determined based on the desirable flow rate of the irrigation liquid that is discharged from communication hole 192 when the pressure of the irrigation liquid exceeds a set value, for example.

In the present embodiment, base 190 is disposed in housing part 181 such that protruding part 194 of base 190 and a part of third connecting groove 136 of the emitter body on the housing part 181 side are locked together before emitter 120 is joined to inner wall surface 112 of tube 110. Thus, positioning of base 190 in the height direction and the circumferential direction of housing part 181 can be performed, and in turn, when the pressure of the irrigation liquid in tube 110 is not exerted on diaphragm part 182, a given amount of clearance between top surface 191 of base 190 and diaphragm part 182 can be ensured. Note that protruding part 194 and the part of third connecting groove 136 on the housing part 181 side function as "clearance formation part that forms a clearance between the base and the diaphragm part" of the embodiment of the present invention.

Effect

As described above, emitter 120 according to the present embodiment includes intake part 150 that communicates with the inside of tube 110 when emitter 120 is joined to tube 110, the pressure reducing channel part (first and second pressure reducing grooves 132 and 135) that forms the pressure reducing channel (first and second pressure reducing channels 142 and 145) for carrying the irrigation liquid while reducing the pressure of the irrigation liquid, the flow rate adjusting part (base 190 and diaphragm part 182) that adjusts the flow rate of the irrigation liquid in accordance with the pressure of the irrigation liquid in tube 110, and discharging part 180 that faces discharging port 111 when emitter 120 is joined to tube 110. The flow rate adjusting part includes base 190, housing part 181 that houses base 190, communication hole 192 that opens at base 190 and communicates with discharging part 180, and diaphragm part 182 having flexibility and disposed apart from base 190. Diaphragm part 182 approaches base 190 when receiving the pressure of the irrigation liquid in tube 110. Diaphragm part 182 is provided as one part integrated with intake part 150 and pressure reducing channel part. Base 190 is a member provided separately from diaphragm part 182, intake part 150 and the pressure reducing channel part.

With this configuration, emitter 120 according to the present embodiment can be produced at a reduced cost in comparison with the case where a diaphragm part is formed in such a manner that a flap that is movable with respect to a known emitter body is formed as one part integrated with the emitter body and the flap is turned about a hinge, and thereafter, the flap is joined to the emitter body by bonding and/or welding, for example. More specifically, the process of turning the flap, and the process of joining the flap to the emitter body by bonding and/or welding can be omitted, and accordingly production cost can be reduced.

In addition, in the present embodiment, emitter 120 can be joined to inner wall surface 112 of tube 110 through a simple process of placing base 190 in housing part 181 without joining base 190 to the emitter body (housing part 181) by bonding and/or welding, and therefore the production cost can be reduced in comparison with the case where base 190 is joined to the emitter body (housing part 181) by bonding and/or welding. Note that even if there is a gap between the inner surface of housing part 181 and the outer surface of base 190 after base 190 is disposed in housing part 181, melted tube 110 fills and seals that gap in the process of joining emitter 120 to inner wall surface 112 of tube 110, and thus the function of the flow rate adjusting part can be provided.

In addition, in the present embodiment, base 190 is disposed in housing part 181 such that protruding part 194 of base 190 and a part of third connecting groove 136 of the emitter body are locked together before emitter 120 is joined to inner wall surface 112 of tube 110. Thus, positioning of base 190 in the height direction and the circumferential direction of housing part 181 can be performed, and in turn, when the pressure of the irrigation liquid in tube 110 is not exerted on diaphragm part 182, a given amount of clearance between top surface 191 of base 190 and diaphragm part 182 can be ensured, and thus, the function of the flow rate adjusting part can be provided.

That is, in the present embodiment, emitter 120 can be joined to inner wall surface 112 of tube 110 through a simple process of placing base 190 in housing part 181 without joining base 190 to the emitter body (housing part 181) by bonding and/or welding, and therefore the production cost can be reduced in comparison with the case where the above-described clearance is ensured by joining base 190 to the emitter body (housing part 181) by bonding and/or welding.

First Modification

While positioning of base 190 in the height direction of housing part 181 is performed by placing base 190 in housing part 181 such that protruding part 194 of base 190 and a part of third connecting groove 136 of the emitter body are locked together in the embodiment, the present invention is not limited to this. For example, as illustrated in FIG. 3E, base 190 may include tapered part 195 (which corresponds to "clearance formation part" of the embodiment of the present invention) formed at the side surface and having a diameter that decreases toward diaphragm part 182 side when base 190 is disposed. With this configuration, positioning of base 190 in the height direction of housing part 181 can be performed, and in turn, when the pressure of the irrigation liquid in tube 110 is not exerted on diaphragm part 182, a given amount of clearance between top surface 191 of base 190 and diaphragm part 182 can be more reliably ensured. Note that while base 190 includes both protruding part 194 and tapered part 195 in the configuration illustrated in FIG. 3E, base 190 may include only tapered part 195.

Second Modification

Figure 4A:
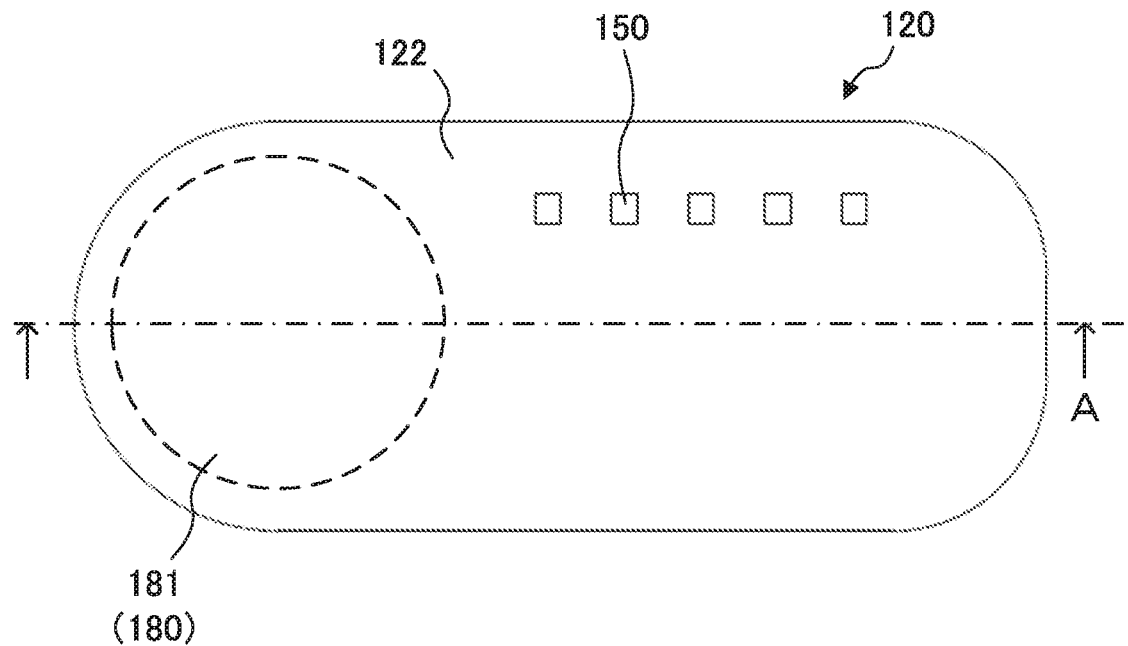
FIGS. 4A and 4B illustrate a modification of the configuration of the emitter according to Embodiment 1 of the present invention.
Figure 4B:
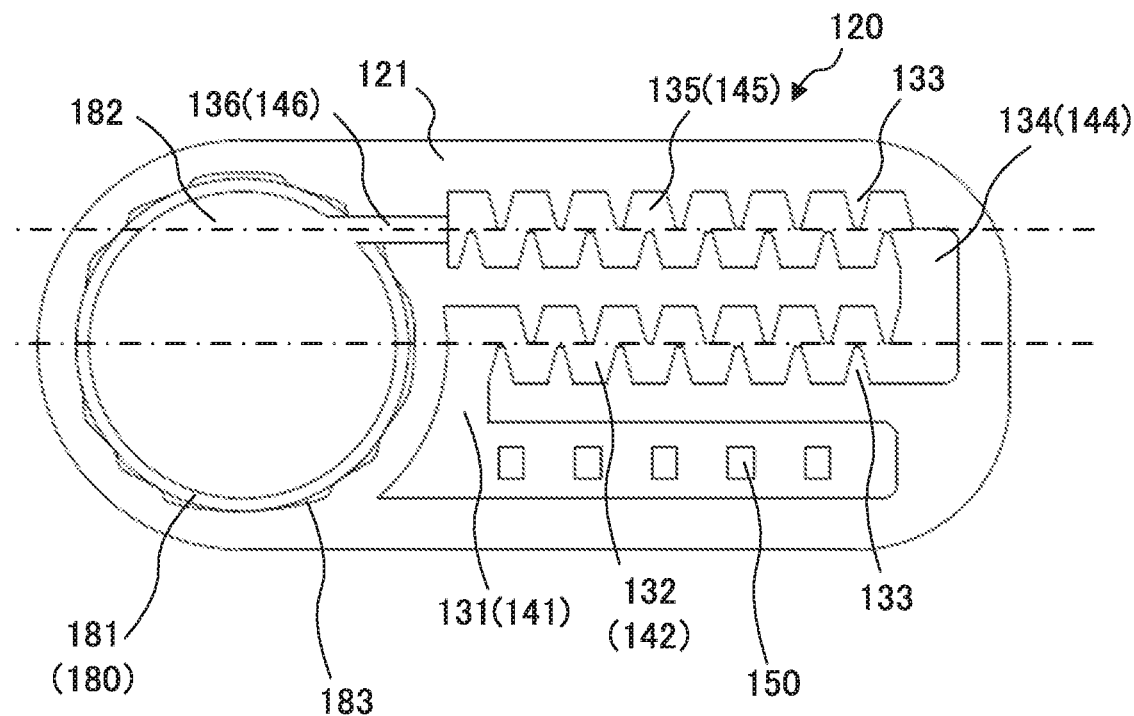
Figure 5A:
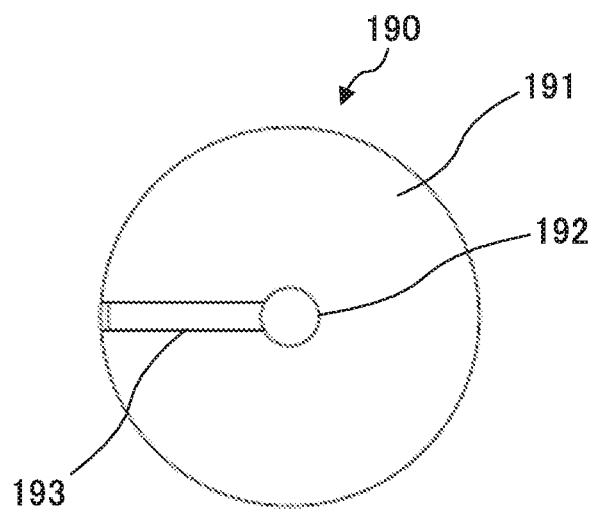
FIGS. 5A and 5B illustrate a modification of the configuration of the base according to Embodiment 1 of the present invention.
Figure 5B:
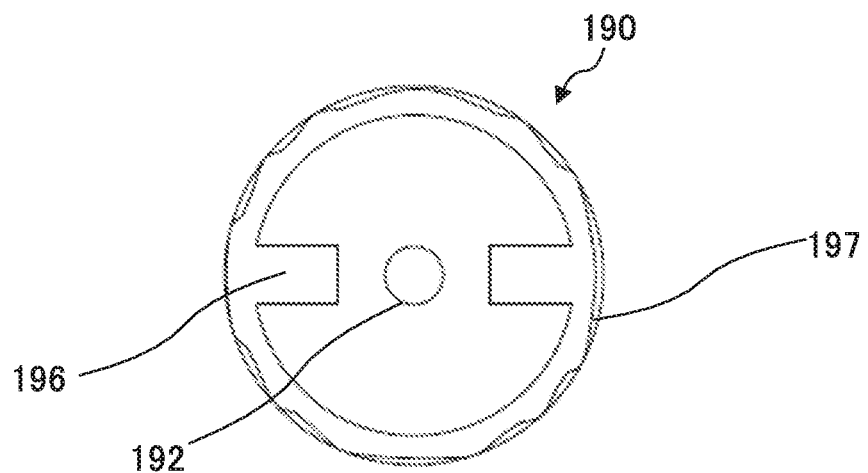

The positioning of base 190 in the height direction of housing part 181 may be achieved by a configuration different from the first modification. FIGS. 4A and 4B illustrate a modification of the configuration of emitter 120 according to the embodiment of the present invention. FIG. 4A is a plan view of emitter 120, and FIG. 4B is a bottom view of emitter 120. FIG. 4B illustrates emitter 120 (emitter body) in the state where base 190 is removed. FIGS. 5A and 5B illustrate a modification of the configuration of base 190 according to the embodiment of the present invention. FIG. 5A is a plan view of base 190, and FIG. 5B is a bottom view of base 190. As illustrated in FIGS. 4A and 4B, screw part 183 (which corresponds to "first screw part" of the embodiment of the present invention) is formed in the inner surface of housing part 181. Further, as illustrated in FIGS. 5A and 5B, screw part 197 (which corresponds to "second screw part" of the embodiment of the present invention) configured to be threadedly engaged with screw part 183 is formed in the outer surface of base 190. Before emitter 120 is joined to inner wall surface 112 of tube 110, base 190 is placed in housing part 181 from rear surface 121 side of emitter 120 while being rotated such that screw part 183 and screw part 197 are threadedly engaged with each other. With this configuration, positioning of base 190 in the height direction of housing part 181 can be performed, and in turn, when the pressure of the irrigation liquid in tube 110 is not exerted on diaphragm part 182, a given amount of clearance between top surface 191 of base 190 and diaphragm part 182 can be ensured. Note that in the configuration illustrated in FIG. 5B, for the purpose of easily holding base 190 when rotating base 190, base 190 includes two holding parts 196 protruding toward communication hole 192 from the outer edge of base 190 and configured for holding base 190 when base 190 is housed in housing part 181.

Embodiment 2

A drip irrigation tube according to Embodiment 2 differs from drip irrigation tube 100 according to Embodiment 1 only in configuration of emitter 220. The same components as those of drip irrigation tube 100 and emitter 120 according to Embodiment 1 are denoted by the same reference numerals, and the descriptions thereof are omitted.

Configuration of Emitter

Figure 6A:
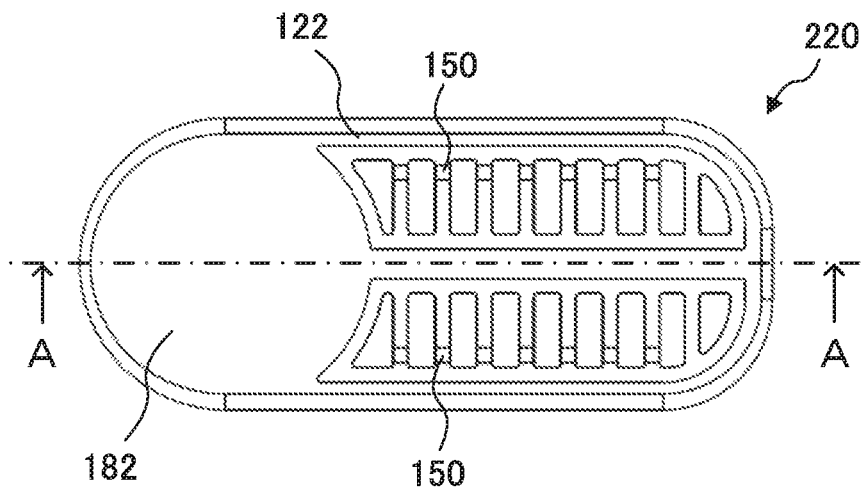
FIGS. 6A, 6B and 6C illustrate a configuration of an emitter according to Embodiment 2 of the present invention.
Figure 6B:
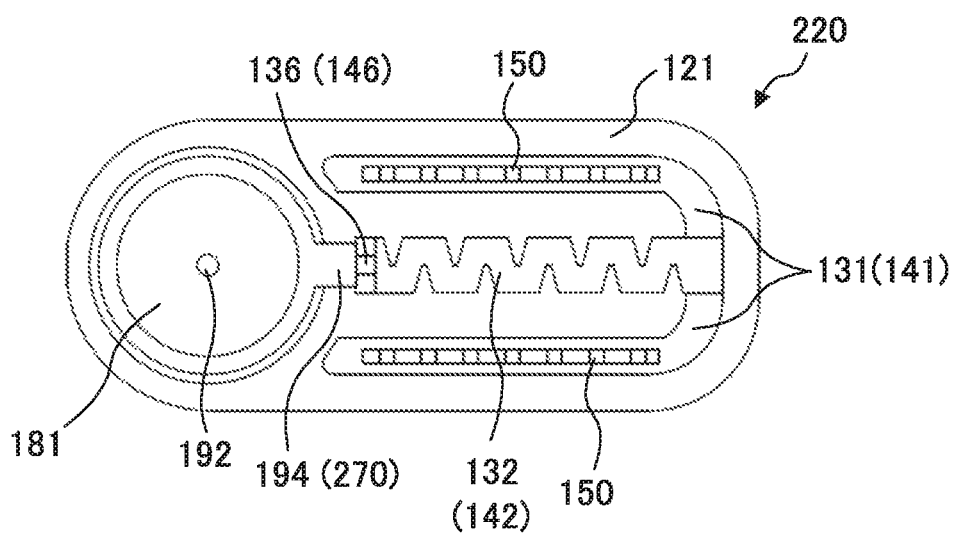
Figure 6C:
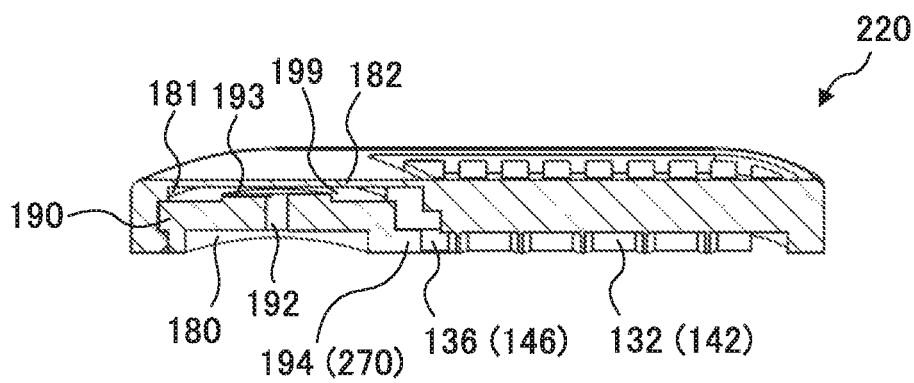

FIGS. 6A to 6C illustrate a configuration of emitter 220 according to Embodiment 2. FIG. 6A is a plan view of emitter 220, FIG. 6B is a bottom view of emitter 220, and FIG. 6C is a sectional view of emitter 220 taken along line A-A of FIG. 6A.

As illustrated in FIGS. 6A to 6C, emitter 220 includes intake part 150, first connecting groove 131 serving as first connecting channel 141, first pressure reducing groove 132 serving as first pressure reducing channel 142, third connecting groove 136 serving as third connecting channel 146, discharging part 180, housing part 181 and base 190. First pressure reducing groove 132 connects between first connecting groove 131 (first connecting channel 141) and third connecting groove 136 (second connecting channel 146). Discharging part 180 is formed when base 190 is housed in housing part 181.

Figure 7A:
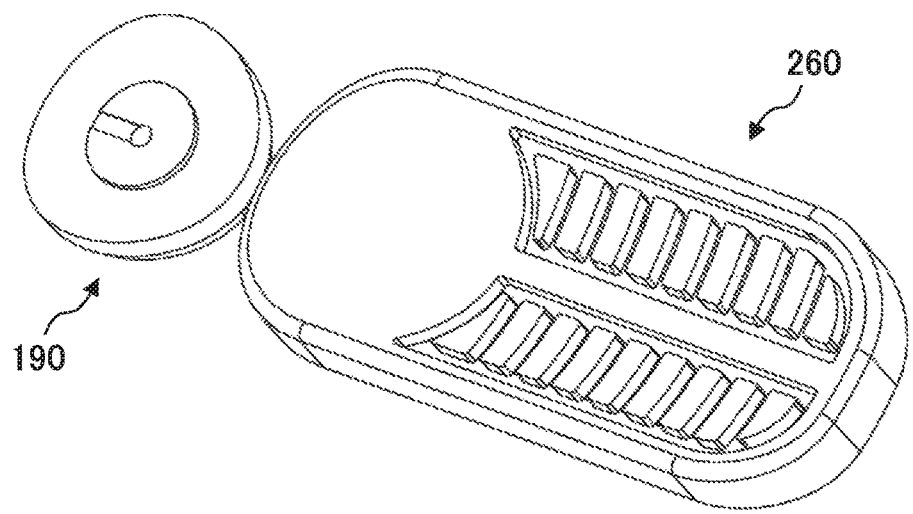
FIGS. 7A, 7B and 7C illustrate a configuration of the emitter according to Embodiment 2 during production.
Figure 7B:
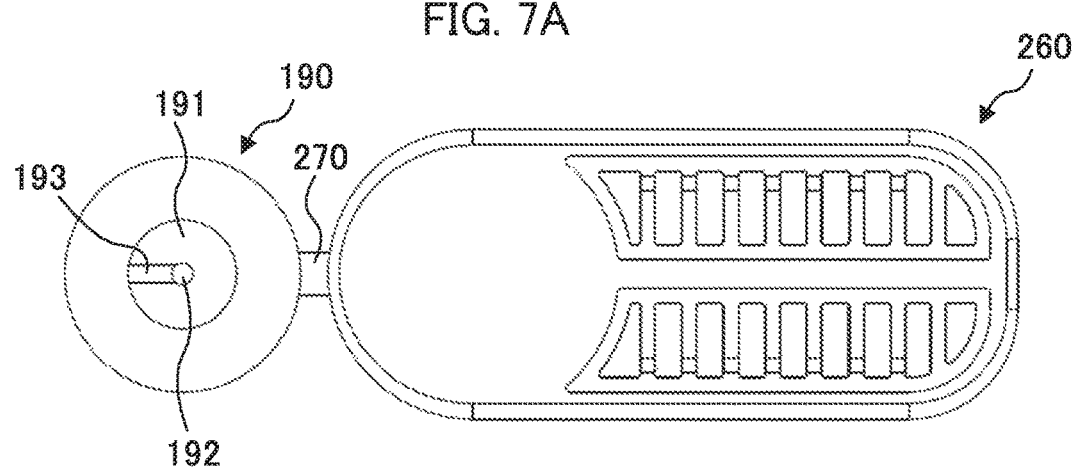
Figure 7C:
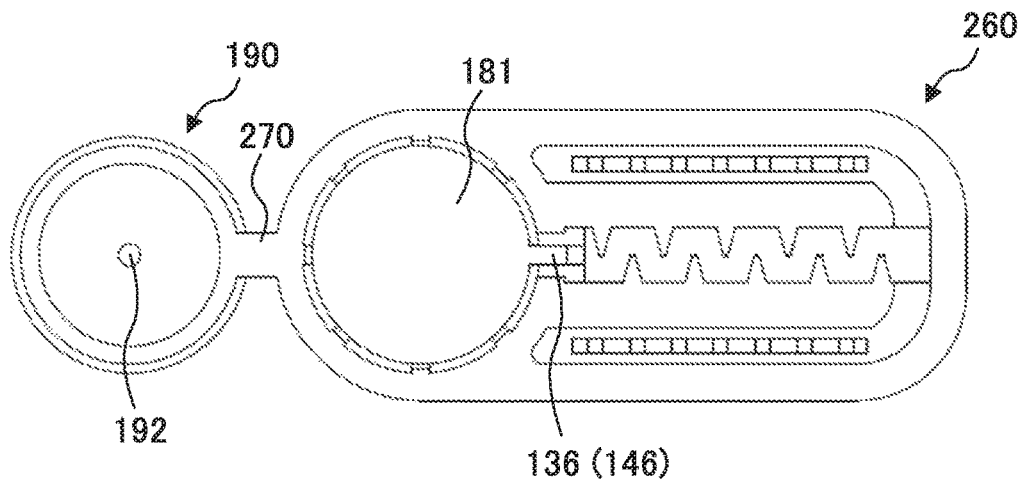

FIGS. 7A to 7C illustrate a configuration of emitter 220 during production (immediately after injection molding). FIG. 7A is a perspective view of emitter 220 during production, FIG. 7B is a plan view of emitter 220 during production, and FIG. 7C is a bottom view of emitter 220 during production.

As illustrated in FIGS. 7A to 7C, emitter 220 during production includes emitter body 260, base 190, and hinge 270 that connects between emitter body 260 and base 190. Emitter body 260 includes the components (intake part 150, first pressure reducing channel 142, diaphragm part 182 and the like) other than base 190.

Emitter body 260 and base 190 are connected by hinge 270, and may be integrally molded as one part. By disconnecting hinge 270 after emitter body 260 and base 190 are integrally molded as one part, emitter body 260 and base 190 are separated from each other. Base 190 thus obtained as a separated member is housed in housing part 181 of emitter body 260 (see FIGS. 6B and 6C). Hinge 270 is disconnected such that it remains in base 190, and thus base 190 includes protruding part 194 (which corresponds to "second locking part" of the embodiment of the present invention) as a remnant of hinge 270. As illustrated in FIGS. 6B and 6C, base 190 is disposed in housing part 181 such that protruding part 194 of base 190 (which corresponds to "second locking part" of the embodiment of the present invention) and a part of third connecting groove 136 of emitter body 260 on the housing part 181 side (which corresponds to "first locking part" of the embodiment of the present invention) are locked together. Thus, positioning of base 190 in the height direction and the circumferential direction of housing part 181 can be performed, and in turn, when the pressure of the irrigation liquid in tube 110 is not exerted on diaphragm part 182, a given amount of clearance between top surface 191 of base 190 and diaphragm part 182 can be ensured.

Effect

With emitter 220 according to Embodiment 2, emitter body 260 and base 190 can be molded in a single operation and can be collectively managed, and thus, production cost can be further reduced while achieving the effect similar to that of emitter 120 according to Embodiment 1.

This application is entitled to and claims the benefit of Japanese Patent Application No. 2018-008748 filed on Jan. 23, 2018, and Japanese Patent Application No. 2018-101334 filed on May 28, 2018, the disclosure each of which including the specification, drawings and abstract is incorporated herein by reference in its entirety.

INDUSTRIAL APPLICABILITY

According to the present invention, an emitter that can adjust the flow rate of output liquid can be provided with reduced production cost. Accordingly, application of the above-described emitter to technical fields such as drip irrigation and endurance test that require long-term dropping, and further development of the technical fields are expected.

REFERENCE SIGNS LIST

100 Drip irrigation tube
110 Tube
111 Discharging port
112 Inner wall surface
120, 220 Emitter
121 Rear surface
122 Front surface
131 First connecting groove
132 First pressure reducing groove
133 Protrusion
134 Second connecting groove
135 Second pressure reducing groove
136 Third connecting groove
141 First connecting channel
142 First pressure reducing channel
144 Second connecting channel
145 Second pressure reducing channel
146 Third connecting channel
150 Intake part
180 Discharging part
181 Housing part
182 Diaphragm part
183 First screw part
190 Base
191 Top surface
192 Communication hole
193 Linking groove
194 Protruding part
195 Tapered part
196 Holding part
197 Second screw part
199 Space
260 Emitter body
270 Hinge

What is claimed is:

1. An emitter configured to be joined on an inner wall surface of a tube configured to carry irrigation liquid at a position corresponding to a discharging port, the emitter being configured to quantitatively discharge the irrigation liquid in the tube to the outside of the tube from the discharging port, the emitter comprising:
an intake part configured to communicate with the inside of the tube when the emitter is joined to the tube;
a pressure reducing channel part communicated with the intake part and configured to form a pressure reducing channel, the pressure reducing channel being configured to carry the irrigation liquid while reducing a pressure of the irrigation liquid;
a flow rate adjusting part communicated with the pressure reducing channel part and configured to adjust a flow rate of the irrigation liquid in accordance with a pressure of the irrigation liquid in the tube; and
a discharging part communicated with the flow rate adjusting part and configured to face the discharging port when the emitter is joined to the tube,
wherein the flow rate adjusting part includes:
a base,
a housing part configured to house the base,
a communication hole that opens at the base and communicates with the discharging part, and
a diaphragm part having flexibility and disposed away from the base, the diaphragm part being configured to approach the base when the pressure of the irrigation liquid in the tube is exerted on the diaphragm part,
wherein the diaphragm part is provided as one part integrated with the intake part and the pressure reducing channel part, and
wherein the base is a member provided separately from the diaphragm part, the intake part, the housing part and the pressure reducing channel part.

2. The emitter according to claim 1, wherein, of the base and the housing part, at least the base includes a clearance formation part configured to form a clearance between the base and the diaphragm part when the pressure of the irrigation liquid in the tube is not exerted on the diaphragm part.

3. The emitter according to claim 2, wherein the clearance formation part includes
   a first locking part formed in the housing part; and
   a second locking part formed in the base and configured to be locked with the first locking part.

4. The emitter according to claim 2, wherein the clearance formation part includes a tapered part formed in a side surface of the base and having a diameter that decreases toward the diaphragm part.

5. The emitter according to claim 2, wherein the clearance formation part includes
   a first screw part formed in the housing part; and
   a second screw part formed in a side surface of the base and configured to be threadedly engaged with the first screw part.

6. The emitter according to claim 5, wherein the base includes a holding part configured for holding the base when the base is housed in the housing part.

7. A drip irrigation tube comprising:
   a tube including a discharging port configured to discharge irrigation liquid; and
   the emitter according to claim 1 that is joined at a position corresponding to the discharging port of an inner wall surface of the tube.

\* \* \* \* \*

UNITED STATES PATENT AND TRADEMARK OFFICE
CERTIFICATE OF CORRECTION

| | | |
|---|---|---|
| PATENT NO. | : 11,317,571 B2 | Page 1 of 1 |
| APPLICATION NO. | : 16/963867 | |
| DATED | : May 3, 2022 | |
| INVENTOR(S) | : Kazuma Yanagisawa et al. | |

It is certified that error appears in the above-identified patent and that said Letters Patent is hereby corrected as shown below:

On the Title Page

Item (73) Assignee, "Emplas Corporation" should be changed to -- Enplas Corporation --

Signed and Sealed this
Thirteenth Day of December, 2022

Katherine Kelly Vidal
*Director of the United States Patent and Trademark Office*